US012386825B1

(12) United States Patent
Shaul et al.

(10) Patent No.: US 12,386,825 B1

(45) Date of Patent: Aug. 12, 2025

(54) PARAMETRIC SEARCHING UNDER FULLY HOMOMORPHIC ENCRYPTION

(71) Applicant: International Business Machines Corporation, Armonk, NY (US)

(72) Inventors: Hayim Shaul, Kfar Saba (IL); Guy Moshkowich, Nes Ziyona (IL); Eyal Kushnir, Kfar Vradim (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/908,157

(22) Filed: Oct. 7, 2024

(51) Int. Cl.

| | |
|---|---|
| ***G06F 16/22*** | (2019.01) |
| ***G06F 16/2453*** | (2019.01) |
| ***H04L 9/00*** | (2022.01) |

(52) U.S. Cl.

CPC ...... *G06F 16/2453* (2019.01); *G06F 16/2246* (2019.01); *G06F 16/2264* (2019.01); *H04L 9/008* (2013.01)

(58) Field of Classification Search

None

See application file for complete search history.

(56) References Cited

U.S. PATENT DOCUMENTS

| | | | | |
|---|---|---|---|---|
| 8,510,302 | B2 * | 8/2013 | Sweeney | G06F 16/35 707/758 |
| 9,195,939 | B1 * | 11/2015 | Goyal | G06N 5/045 |
| 10,275,480 | B1 * | 4/2019 | Evenson | G06F 16/2246 |
| 10,902,062 | B1 * | 1/2021 | Guha | G06F 16/9027 |
| 11,294,960 | B1 * | 4/2022 | Zuber | G06F 16/2246 |
| 11,502,820 | B2 * | 11/2022 | Ratha | H04L 9/065 |
| 12,015,550 | B1 * | 6/2024 | Mishra | G06T 11/206 |
| 12,123,291 | B1 * | 10/2024 | Tian | E21B 43/16 |
| 12,129,752 | B1 * | 10/2024 | Tian | E21B 44/00 |

(Continued)

FOREIGN PATENT DOCUMENTS

| | | | |
|---|---|---|---|
| CN | 116266180 | A | 6/2023 |
| CN | 117828660 | A | 4/2024 |
| EP | 3264669 | A1 | 1/2018 |

OTHER PUBLICATIONS

Cheon et al., "Tree-based Lookup Table on Batched Encrypted Queries using Homomorphic Encryption," Cryptology ePrint Archive, Jan. 23, 2024, pp. 1-12, iacr.org, accessed Aug. 23, 2024, https://eprint.iacr.org/2024/087.

(Continued)

*Primary Examiner* — Eliyah S. Harper

(74) *Attorney, Agent, or Firm* — Yee & Associates, P.C.

(57) ABSTRACT

A computer-implemented method for identifying a leaf in a tree is provided. A processor set receives a first point representing one or more values within a d-dimensional space for identifying the leaf in the tree. The processor set generates a parameter for identifying the leaf in the tree. The processor set identifies a node at highest depth of the tree. The processor set determines a first value of the parameter for generating a range. The processor set selects a subset of child nodes from the number of child nodes associated with the node at the highest depth of the tree based on the range. The processor sets the subset of child nodes as the node at the highest depth of the tree. The processor set traverses the tree by repeating the identifying step, the determining step, the selecting step, and setting steps until the leaf in the tree is identified.

20 Claims, 6 Drawing Sheets

300
σ = [10,40]
σ = [50,80]
10 20 30 40 50 51 70 80
Q: WHAT IS THE CLOSEST POINT TO q = 48
CONTAINING LEFT SON WHEN a > max{40 - q, q - 10} = 38
CONTAINING RIGHT SON WHEN a > max{80 - q, q - 50} = 32
INTERSECTING LEFT SON WHEN a > max{q - 40, 10 - q, 0} = 8
INTERSECTING RIGHT SON WHEN a > max{q - 80, 50 - q, 0} = 2
INTERSECTING 2 SONS WHEN a > max{2,8} = 8
THEREFORE a < min{38,32,8} = 8
WHEN a < 8 NEED TO RECURSE ONLY INTO THE RIGHT SON 302
304
306
σ = [50,51]
σ = [70,80]
50 51 70 80
Q: WHAT IS THE CLOSEST POINT TO q = 48
a < 8
CONTAINING LEFT SON WHEN a > max{51 - q, q - 50} = 3
CONTAINING RIGHT SON WHEN a > max{80 - q, q - 70} = 32
INTERSECTING LEFT SON WHEN a > max{q - 51, 50 - q, 0} = 2
INTERSECTING RIGHT SON WHEN a > max{q - 80, 70 - q, 0} = 22
INTERSECTING 2 SONS WHEN a > max{22,2} = 22
THEREFORE a < min{3,32,22,8} = 3
WHEN a < 3 NEED TO RECURSE ONLY INTO THE LEFT SON 308
304
310
312
σ = [50,50]
σ = [51,51]
50 51
Q: WHAT IS THE CLOSEST POINT TO q = 48
a < 3
CONTAINING LEFT SON WHEN a > max{50 - q, q - 50} = 2
CONTAINING RIGHT SON WHEN a > max{51 - q, q - 51} = 3
THEREFORE a = min{3,2} = 2
WHEN a = 2, THE RANGE INCLUDES THE LEFT SON – WHICH IS THE CLOSEST POINT TO q

(56) References Cited

U.S. PATENT DOCUMENTS

| | | | | |
|---|---|---|---|---|
| 2003/0018623 | A1* | 1/2003 | Aggarwal | G06F 16/29 |
| 2004/0073475 | A1* | 4/2004 | Tupper | G06Q 10/06<br>703/2 |
| 2010/0241662 | A1* | 9/2010 | Keith, Jr. | G06F 16/2246<br>709/227 |
| 2013/0317878 | A1* | 11/2013 | Mansoor | G06F 16/285<br>705/7.26 |
| 2017/0213127 | A1* | 7/2017 | Duncan | G16B 50/30 |
| 2017/0235848 | A1* | 8/2017 | Van Dusen | G06Q 30/0201<br>705/12 |
| 2019/0035138 | A1* | 1/2019 | Fuetterling | G06T 15/06 |
| 2023/0020080 | A1* | 1/2023 | Kishore | G06F 16/2272 |
| 2024/0297777 | A1* | 9/2024 | Shaul | G06F 16/24564 |

OTHER PUBLICATIONS

Kushnir et al., "Secure Range-Searching Using Copy-And-Recurse," Cryptology ePrint Archive, Apr. 8, 2024, pp. 1-19, iacr.org, accessed Aug. 23, 2024, https://eprint.iacr.org/2023/983.

Megiddo, "Applying Parallel Computation Algorithms in the Design of Serial Algorithms," Journal of the ACM (JACM), Oct. 1, 1983, pp. 852-865, acm.org, accessed Aug. 23, 2024, https://doi.org/10.1145/2157.322410.

* cited by examiner

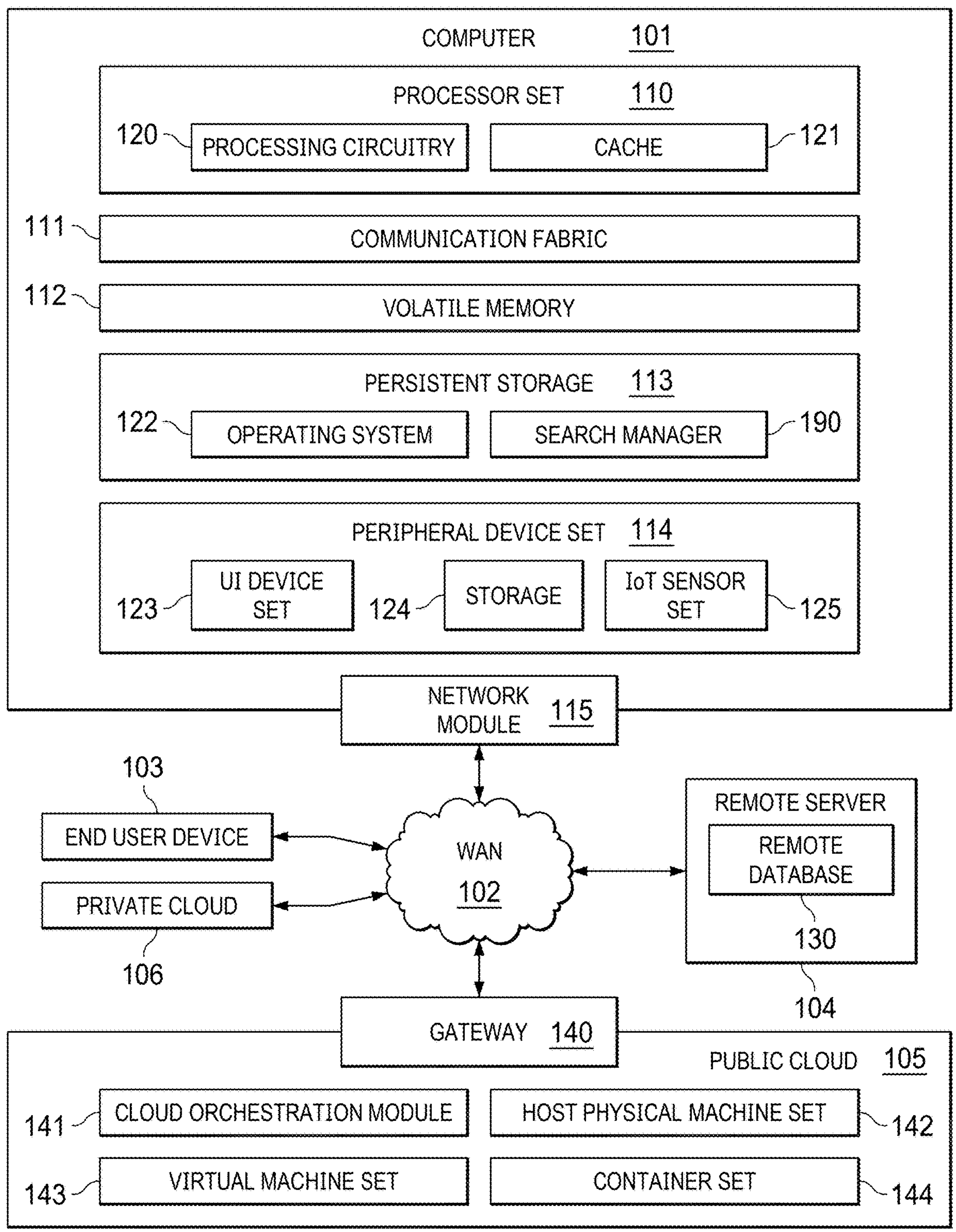
COMPUTING ENVIRONMENT
100
FIG. 1
COMPUTER 101
PROCESSOR SET 110
120
PROCESSING CIRCUITRY
CACHE
121
111
COMMUNICATION FABRIC
112
VOLATILE MEMORY
PERSISTENT STORAGE 113
122
OPERATING SYSTEM
SEARCH MANAGER
190
PERIPHERAL DEVICE SET 114
123
UI DEVICE SET
124
STORAGE
IoT SENSOR SET
125
NETWORK MODULE 115
103
END USER DEVICE
PRIVATE CLOUD
106
WAN 102
REMOTE SERVER
REMOTE DATABASE
130
104
GATEWAY 140
PUBLIC CLOUD 105
141
CLOUD ORCHESTRATION MODULE
HOST PHYSICAL MACHINE SET
142
143
VIRTUAL MACHINE SET
CONTAINER SET
144

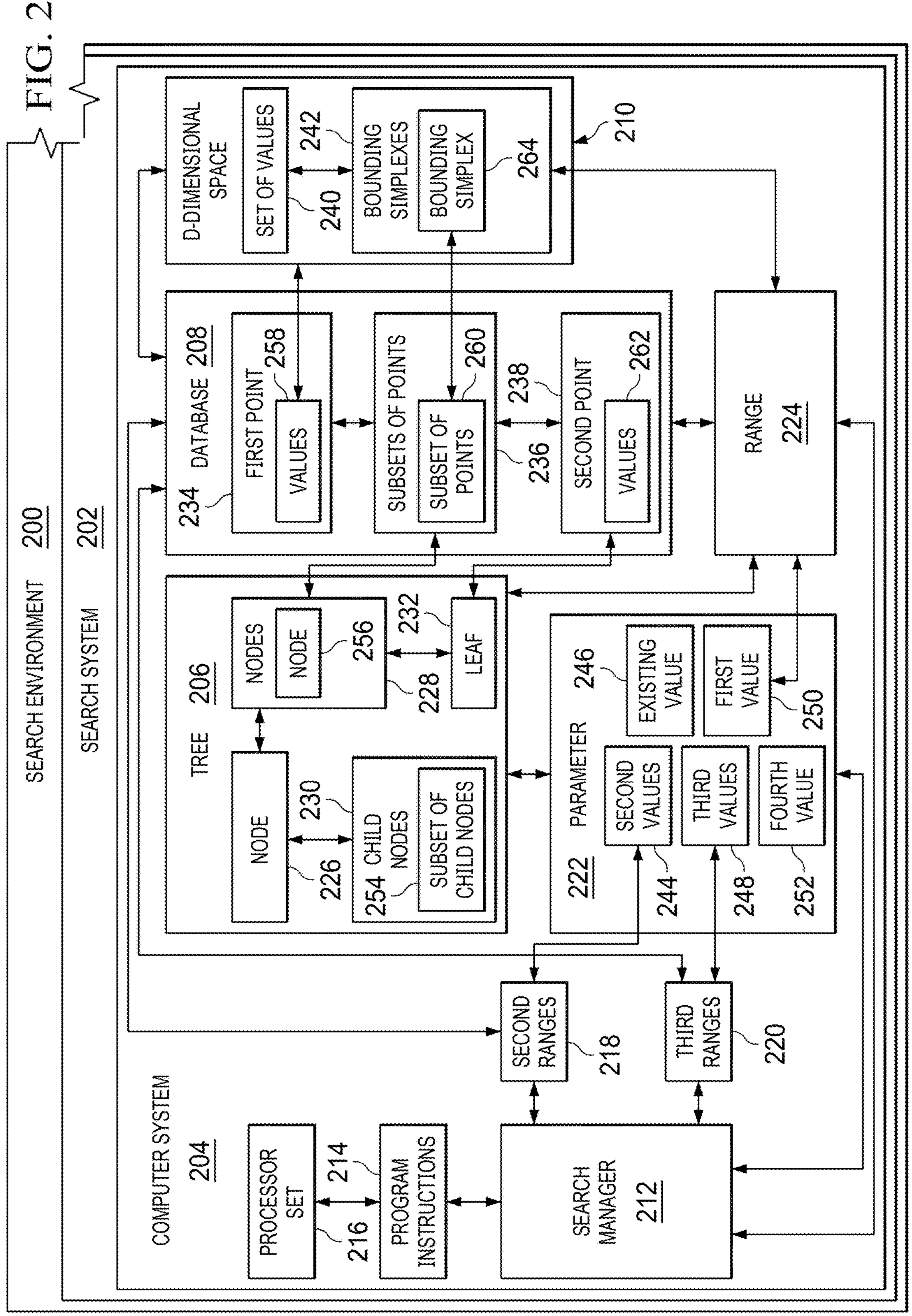
FIG. 2
SEARCH ENVIRONMENT 200
SEARCH SYSTEM 202
COMPUTER SYSTEM 204
TREE 206
DATABASE 208
D-DIMENSIONAL SPACE
210
SEARCH MANAGER 212
PROGRAM INSTRUCTIONS
214
PROCESSOR SET
216
SECOND RANGES
218
THIRD RANGES
220
PARAMETER
222
RANGE 224
NODE
226
NODES
NODE
256
228
LEAF
232
230
CHILD NODES
254
SUBSET OF CHILD NODES
FIRST POINT
234
VALUES
258
SUBSETS OF POINTS
SUBSET OF POINTS
236
260
238
SECOND POINT
VALUES
262
SET OF VALUES
240
242
BOUNDING SIMPLEXES
BOUNDING SIMPLEX
264
SECOND VALUES
244
EXISTING VALUE
246
THIRD VALUES
248
FIRST VALUE
250
FOURTH VALUE
252

PARAMETRIC SEARCHING UNDER FULLY HOMOMORPHIC ENCRYPTION

BACKGROUND

The disclosure relates generally to parametric searching and more specifically to parametric searching under fully homomorphic encryption.

Parametric searching is an algorithmic technique used to solve optimization problems by systemically adjusting a parameter. Parametric searching transforms a complex optimization problem into a simple decision problem that determines whether a solution exists for a given parameter value.

Parametric searching is useful in problems where the objective is to minimize or maximize a certain criterion, such as finding the smallest enclosing circle around a set of points in geometric optimization. In addition, parametric searching can be applied to management of network flow and scheduling problems, where parameters such as time, cost, or capacity influence the outcome. In this case, computational resources required for solving these problems can be reduced by efficiently narrowing down the search space using parametric searching, especially when dealing with large datasets or complex systems.

SUMMARY

According to one illustrative embodiment, a computer-implemented method for identifying a leaf in a tree is provided. A processor set receives a first point representing one or more values within a d-dimensional space for identifying the leaf in the tree. The tree is generated based on a set of values within the d-dimensional space and each node in the tree represents a subset of points with a bounding simplex within the d-dimensional space. The processor set generates a parameter for identifying the leaf in the tree. The leaf in the tree represents a second point representing one or more values that is nearest to the first point. The processor set identifies a node at the highest depth of the tree. The node at the highest depth of the tree is associated with a number of child nodes. The processor set determines a first value of the parameter for generating a range. The first value is determined based on an existing value for the parameter and bounding simplexes for all child nodes associated with the node at the highest depth of the tree. The processor set selects a subset of child nodes from the number of child nodes associated with the node at the highest depth of the tree based on the range. The subset of child nodes represent points for values within a subrange that overlaps with the range. The processor set setts the subset of child nodes as the node at the highest depth of the tree. The processor set traverses the tree by repeating the identifying step, the determining step, the selecting step, and setting steps until the leaf in the tree is identified. According to other illustrative embodiments, a computer system, and a computer program product for optimizing memory usage are provided.

BRIEF DESCRIPTION OF THE DRAWINGS

FIG. 1 is a pictorial representation of a computing environment in which illustrative embodiments may be implemented;

FIG. 2 is an illustration of a block diagram of a search environment in accordance with an illustrative embodiment;

DETAILED DESCRIPTION

Figure 3:
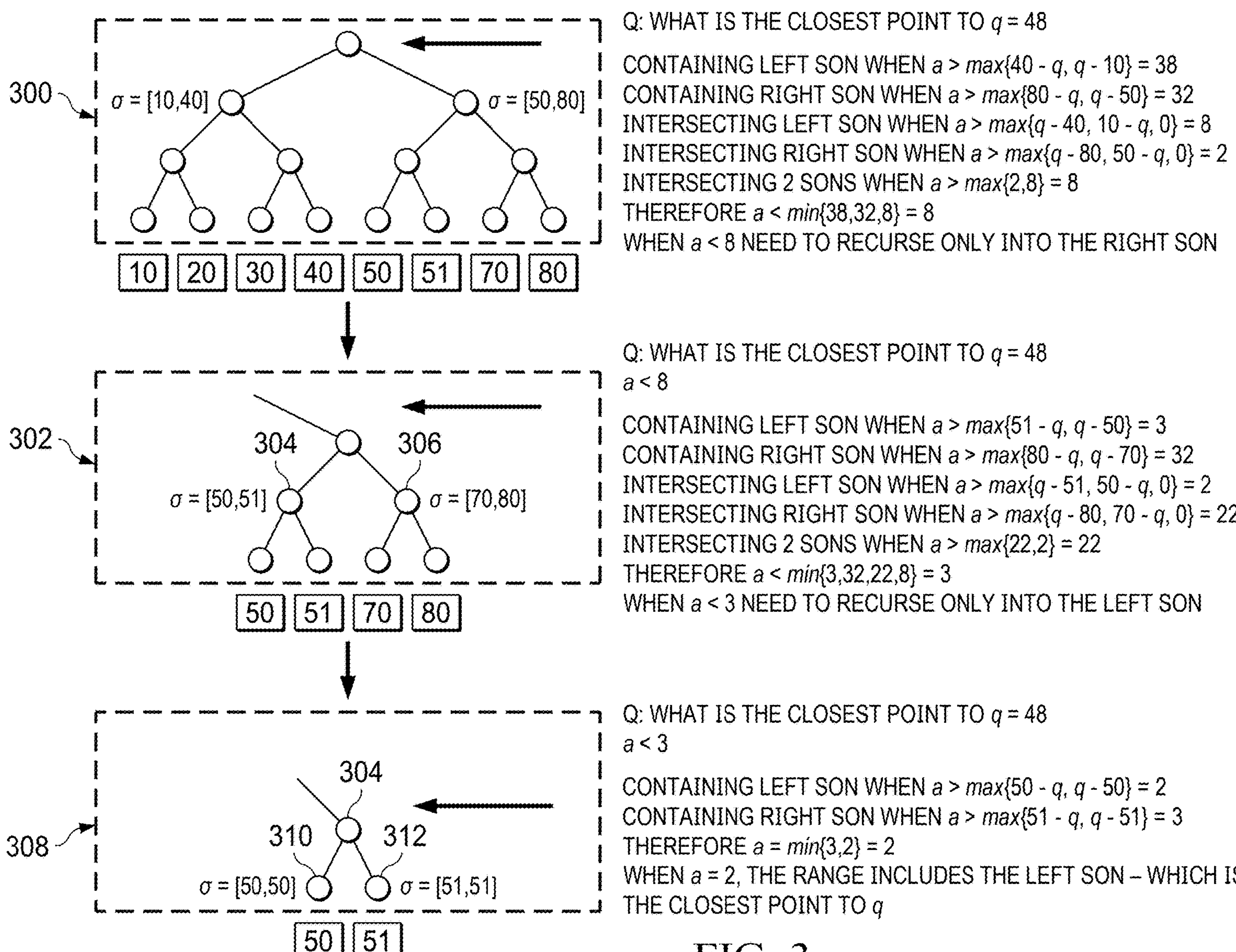
FIG. 3 is an illustration of a process flow for identifying a leaf in a tree in accordance with an illustrative embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference now to the figures, and in particular with reference to FIG. 1, a block diagram of a computing environment is depicted in accordance with an illustrative embodiment. Computing environment 100 contains an example of an environment for the execution of at least some of the computer code involved in performing the inventive methods, such as search manager 190. In addition to search manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and search manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one or more computer processors of any type now known or to be developed in the future. Processing circuitry 120 may be distributed over multiple packages, for example, multiple coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions and associated data are accessed by processor set 110 to control and direct performance of the inventive methods. In computing environment 100, at least some of the instructions for performing the inventive methods may be stored in search manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but, alternatively or additionally, volatile memory 112 may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in search manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as a thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data application portability between the multiple constituent clouds. In this embodiment, public cloud 105 and private cloud 106 are both part of a larger hybrid cloud.

CLOUD COMPUTING SERVICES AND/OR MICROSERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. For example, the illustrative embodiments recognize and take into account that computational geometry often employs parametric searching for solving problems such as smallest enclosing circles, minimum spanning trees, or cutting stock problems.

The illustrative embodiments also recognize and take into account that fully homomorphic encryption (FHE) allows computations on encrypted data without the need to decrypt. In other words, fully homomorphic encryption allows operations such as addition and multiplication to be performed on the ciphertexts.

The illustrative embodiments also recognize and take into account that combining fully homomorphic encryption with parametric searching presents significant challenges. For example, fully homomorphic encryption involves complex mathematical operations that introduce a significant computational burden. Therefore, executing parametric searching on fully homomorphic encrypted data will be very slow. In addition, FHE-based computations are difficult to parallelize due to the complexity and encryption constraints.

Thus, illustrative embodiments of the present invention provide a computer implemented method, computer system, and computer program product for identifying a leaf in a tree. In one illustrative example, a computer implemented method applies parametric searching with fully homomorphic encrypted data. A processor set receives a first point representing one or more values within a d-dimensional space for identifying the leaf in the tree. The tree is generated based on a set of values within the d-dimensional space and each node in the tree represents a subset of points with a bounding simplex within the d-dimensional space. The processor set generates a parameter for identifying the leaf in the tree. The leaf in the tree represents a second point representing one or more values that is nearest to the first point. The processor set identifies a node at the highest depth of the tree. The node at the highest depth of the tree is associated with a number of child nodes. The processor set determines a first value of the parameter for generating a range. The range is generated based on existing values for the parameter and bounding simplexes for all child nodes associated with the node at the highest depth of the tree. The processor set selects a subset of child nodes from the number of child nodes associated with the node at the highest depth of the tree based on the range. The subset of child nodes represent points for values within a subrange that overlaps with the range. The processor set sets the subset of child nodes as the node at the highest depth of the tree. The processor set traverses the tree by repeating the identifying step, the determining step, the selecting step, and setting steps until the leaf in the tree is identified.

With reference now to FIG. 2, an illustration of a block diagram of a search environment is depicted in accordance with an illustrative embodiment. In this illustrative example, search environment 200 includes components that can be implemented in hardware such as the hardware shown in computing environment 100 in FIG. 1.

In this illustrative example, search system 202 in search environment 200 can be used to identify a leaf in a tree to solve a searching problem. For example, it can be used to find a geographical location of a facility of interest that is closest to a given geographical coordinate. In this illustrative example, search system 202 includes computer system 204 which includes search manager 212. Search manager 212 is located in computer system 204. Search manager 212 may be implemented using search manager 190 in FIG. 1.

Search manager 212 can be implemented in software, hardware, firmware, or a combination thereof. When software is used, the operations performed by search manager 212 can be implemented in program instructions configured to run on hardware, such as a processor unit. When firmware is used, the operations performed by search manager 212 can be implemented in program instructions and data and stored in persistent memory to run on a processor unit. When hardware is employed, the hardware can include circuits that operate to perform the operations in search manager 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C," may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 204 is a physical hardware system and includes one or more data processing systems. When more than one data processing system is present in computer system 204, those data processing systems are in communication with each other using a communications medium.

The communications medium can be a network. The data processing systems can be selected from at least one of a computer, a server computer, a tablet computer, or some other suitable data processing system.

As depicted, computer system 204 includes processor set 216 that is capable of executing program instructions 214 implementing processes in the illustrative examples. In other words, program instructions 214 are computer-readable program instructions.

As used herein, a processor unit in processor set 216 is a hardware device and is comprised of hardware circuits such as those on an integrated circuit that respond to and process instructions and program code that operate a computer. A processor unit can be implemented using processor set 110 in FIG. 1. When processor set 216 executes program instructions 214 for a process, processor set 216 can be one or more processor units that are in the same computer or in different computers. In other words, the process can be distributed between processor set 216 on the same or different computers in computer system 204.

Further, processor set 216 can be of the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, computer system 204 includes tree 206 that includes nodes 228. Tree 206 is a data structure that mimics a hierarchical, tree-like organization of data. In this illustrative example, tree 206 can be a binary tree, a partition tree, a B-tree, or any hierarchical structure. In this illustrative example, each node in nodes 228 can also represent a geographical location.

Tree 206 includes nodes 228. In this illustrative example, each node in nodes 228 represents a subset of points from subsets of points 236 in database 208. For example, node 256 in nodes 228 represents subset of points 260 in subsets of points 236. In this illustrative example, points in subsets of points 236 are data entries or records in database 208 that include values that correspond to set of values 240 in d-dimensional space 210. In this illustrative example, each subset of points in subsets of points 236 can include one or more points.

In this illustrative example, d-dimensional space 210 is a geometric concept in which the number of dimensions is represented by variable "d". For example, 1-dimensional space can be visualized as a straight line, where a point on the line can be described by a single value that specifies a position for the point on the line. In addition, 2-dimensional space can be visualized as a flat plane, where a point can be described by two values that describe horizontal position and vertical position for the point. Further, 3-dimensional space can be visualized as any 3-dimensional object, where a point is described by three values that represent width, height, and depth of the point.

In this illustrative example, d-dimensional space 210 includes bounding simplexes 242 that represent possible convex shapes with "d+1" corners that enclose a set of points in a given shape in d-dimensional space 210. In this illustrative example, each bounding simplex from bounding simplexes 242 defines a range for values represented by a number of points. For example, subset of points 260 includes values that can be enclosed by bounding simplex 264 in d-dimensional space 210. In other words, node 256 in tree 206 represents subset of points 260 that can be enclosed by bounding simplex 264 in d-dimensional space 210.

In this illustrative example, search manager 212 receives first point 234 from database 208. First point 234 includes one or more values 258 that can be used for identifying leaf 232 in tree 206. In this illustrative example, leaf 232 represents second point 238 that includes one or more values 262 that is nearest to the one or more values 258 for first point 234.

Leaf 232 is a leaf in tree 206. In this illustrative example, leaves are nodes that are located at the lowest depth of tree 206. In this illustrative example, leaves such as leaf 232 represent one point that corresponds to one or more values from set of values 240 in d-dimensional space 210.

In this illustrative example, search manager 212 can identify leaf 232 in tree 206 by traversing tree 206 to solve a searching problem that involves fully homomorphic encrypted data. In other words, search manager 212 can solve problems that involve encrypted values from set of values 240, which correspond to subsets of points 236 that are represented by nodes 228.

In this illustrative example, search manager 212 generates parameter 222 for algorithms of identifying leaf 232 for first point 234. Parameter 222 includes existing value 246 that is either a predefined value or obtained from a previous round of computation. In this illustrative example, search manager 212 identifies node 226 in tree 206 for identifying leaf 232. Node 226 is a node at the highest depth in tree 206. It should be understood that node 226 refers to different nodes in tree 206 during traversal of tree 206. In this illustrative example, node 226 is associated with a number of child nodes 230. The number of child nodes 230 are nodes that are directly connected to node 226 in tree 206.

In this illustrative example, search manager 212 can generate first value 250 based on existing value 246 for parameter 222 and bounding simplexes for the number of child nodes 230 in bounding simplexes 242.

In this illustrative example, first value 250 can be generated in a number of ways. For example, search manager 212 can generate second values 244 for all child nodes in the number of child nodes 230. In this illustrative example, each second value in second values 244 is generated based on values 258 for first point 234 and bounding simplexes for each child node in the number of child nodes 230.

In this illustrative example, bounding simplexes for each child node in the number of child nodes 230 is contained within a second range from second ranges 218. In this illustrative example, each second range in second ranges 218 is determined based on values 258 for first point 234 and a second value from second values 244 for a child node in the number of child nodes 230.

In addition, search manager 212 can generate third values 248 for all child nodes in the number of child nodes 230. In this illustrative example, each third value in third values 248 is generated based on values 258 for first point 234 and bounding simplex for each child node in the number of child nodes 230.

In this illustrative example, bounding simplexes for each child node in the number of child nodes 230 is intersected with a third range from third ranges 220. In this illustrative example, each third range in third ranges 220 is determined based on values 258 for first point 234 and a third value from third values 248 for a child node in the number of child nodes 230.

Further, search manager 212 can generate fourth value 252 by identifying the maximum from third values 248 for all child nodes from the number of child nodes 230. In this illustrative example, search manager 212 can identify first value 250 as the minimal value from existing value 246, second values 244, third values 248, and fourth value 252.

It should also be understood that values for parameter 222 change through the traversal of tree 206 as node 226 and the number of child nodes 230 changes through the traversal of tree 206. In other words, existing value 246, first value 250, second ranges 218, second values 244, third ranges 220, third values 248, and fourth value 252 changes through the traversal of tree 206.

In this illustrative example, search manager 212 determines range 224 based on first value 250 and values 258 for first point 234. Further, search manager 212 selects subset of child nodes 254 from the number of child nodes 230 based on range 224. In this illustrative example, subset of child nodes 254 represents points for values within a subrange that overlaps with range 224. It should also be understood that range 224 changes through the traversal of tree 206 as node 226 and the number of child nodes 230 changes through the traversal of tree 206.

In this illustrative example, search manager 212 can determine whether subset of child nodes 254 includes any leaf in tree 206. If subset of child nodes 254 includes leaf in tree 206, the leaf in subset of child nodes 254 can be identified as leaf 232. On the other hand, if subset of child nodes 254 does not include any leaf in tree 206, search manager 212 sets subset of child nodes 254 as node 226 and repeats the method mentioned above to generate values for parameter 222 and range 224 to determine whether subset of child nodes 254 includes any leaf in tree 206 again. In other words, search manager 212 operates to perform a method that traverses tree 206 through different depths of tree 206 until leaf 232 is identified at the lowest depth of tree 206.

The illustration of search environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, node 226 can include multiple nodes since multiple nodes can be identified as the nodes at the highest depth of tree 206.

With reference now to FIG. 3, a process flow for illustrating identification of a leaf in a tree is shown in accordance with an illustrative embodiment. The process in FIG. 3 can be implemented in hardware, software, or both. When implemented in software, the process can take the form of program instructions that are run by one of more processor units located in one or more hardware devices in one or more computer systems. For example, the process flow can be implemented as program instructions that can be executed by search manager 212 in computer system 204 in FIG. 2.

In this illustrative example, the process flow shown in FIG. 3 illustrates tree 300 with nodes that represent points with a bounding simplex within 1-dimensional space. As a result, tree 300 shown in FIG. 3 is a partition tree generated based on a set of values within the 1-dimensional space. In other words, the term "values" and "points" for nodes of tree 300 are interchangeable because points represented by nodes in tree 300 only includes 1 value.

In FIG. 3, the process flow aims to traverse tree 300 to identify a leaf in tree 300 that represents the point closest to "q" with a value of 48. In addition, values of points represented by leaves are shown below each leaf. In this illustrative example, the traversal of tree 300 starts from the root node in tree 300 since the root node is the node at the highest depth at the beginning of the traversal. In this illustrative example, the root node represents a range of values from 10 to 80. As depicted, the child nodes associated with the root node in tree 300 include right child node and left child node. In this illustrative example, left child node for the root node represents a range of values from 10 to 40 and right child node for the root node represents a range of values from 50 to 80.

In the first round of traversal, parameter "a" is generated for identifying the leaf. In this illustrative example, parameter "a" is an example of parameter 222 in FIG. 2. In this illustrative example, parameter "a" can have an existing value from a previous round of traversal, or a predefined value. In this illustrative example, a number of values are determined for parameter "a".

For example, a value of "38" for parameter "a" is determined based on value of "q" and range represented by the left child node for the root node. In this illustrative example, the value of "38" for parameter "a" can be used in combination with value of "q" to generate a range such that the range contains all values represented by the left child node for the root node. For example, a range of [q−a, q+a] can be generated to obtain a range of [48−38, 48+38] to indicate that the range of [10, 86] contains all values represented by the left child node for the root node. In other words, the range of [q−a, q+a] contains all values represented by the left child node for the root node when a>38.

In a similar fashion, a value of "32" for parameter "a" is determined based on value of "q" and range represented by the right child node for the root node. In this illustrative example, the value of "32" for parameter "a" can be used in combination with value of "q" to generate a range such that the range contains all values represented by the right child node for the root node. For example, a range of [q−a, q+a] can be generated to obtain a range of [48−32, 48+32] to indicate that the range of [16, 80] contains all values represented by the right child node for the root node. In other words, the range of [q−a, q+a] contains all values represented by the right child node for the root node when a>32.

In this illustrative example, the value of "38" and the value of "32" can be examples of second values 244 in FIG. 2. In addition, the range of [10, 86] and the range of [16, 80] can be examples of second ranges 218 in FIG. 2.

In addition, a value of "8" for parameter "a" is determined based on value "0", value of "q" and range represented by the left child node for the root node. In this illustrative example, value "0" is used to make sure value determined for "a" is a positive number. In this illustrative example, the value of "8" for parameter "a" can be used in combination with value of "q" to generate a range such that the range intersects with the range represented by the left child node for the root node. For example, a range of [q−a, q+a] can be generated to obtain a range of [48−8, 48+8] to indicate that the range of [40, 56] intersects with the range represented by the left child node for the root node. In other words, the range of [q−a, q+a] contains a range of values that overlaps with the range represented by the left child node for the root node when a>8.

In a similar fashion, a value of "2" for parameter "a" is determined based on value "0", value of "q" and range represented by the right child node for the root node. In this illustrative example, value "0" is used to make sure the value determined for "a" is a positive number. In this illustrative example, the value of "2" for parameter "a" can be used in combination with value of "q" to generate a range such that the range intersects with the range represented by the right child node for the root node. For example, a range of [q−a, q+a] can be generated to obtain a range of [48−2, 48+2] to indicate that the range of [46, 50] intersects with the range represented by the right child node for the root node. In other words, the range of [q−a, q+a] contains a range of values that overlaps with the range represented by the right child node for the root node when a>2.

In this illustrative example, the value of "8" and the value of "2" can be examples of third values 248 in FIG. 2. In addition, the range of [40, 56] and the range of [46, 50] can be examples of third ranges 220 in FIG. 2.

Further, a value of "8" for parameter "a" is determined by identifying the maximum from the value of "2" and the value "8". In this illustrative example, the value of "8" for parameter "a" can be used in combination with value of "q" to generate a range such that the range intersects with both ranges represented by the two child nodes for the root node. For example, a range of [q−a, q+a] can be generated to obtain a range of [48−8, 48+8] to indicate that the range of [40, 56] intersects with both ranges represented by the two child nodes for the root node. In other words, the range of [q−a, q+a] contains a range of values that overlaps with both ranges represented by the two child nodes for the root node when a>8. In this illustrative example, the value of "8" can be examples of fourth value 252 in FIG. 2.

In this illustrative example, a final value for parameter "a" for the first round of traversal is determined by identifying the minimum from the value of "38", the value of "32", and the value of "8". As a result, the value of "8" is identified as the final value for parameters "a". In other words, the first round of traversal narrows down the range for identifying leaf from [10, 80] to a range of [q−a, q+a] m where a<8. In this illustrative example, the value of "8" can be examples of first value 250 in FIG. 2.

In this illustrative example, the right child node for the root node is selected for further processing since range of [q−a, q+a] m where a<8 exceeds values contained in range of [10,40], which is represented by the left child node for the root node. In this illustrative example, the right child node for the root node is set as the node at the highest depth of tree 300 and the rest of tree 300 is disregarded in the second round of traversal for tree 300.

The value of "8" is set as the existing value for parameter "a" in the second round of traversal for tree 300. In this illustrative example, the second round of traversal for tree 300 repeats the above mentioned steps for the node at the highest depth in portion 302 to determine new values for parameter "a" such that the range generated based on parameter "a" can be used to further narrow down the range for identifying the leaf. As shown in portion 302, the right child node for the root node is set as the node at the highest depth and the right child node for the root node associated with node 304 and node 306.

Specifically, a value of "3" for parameter "a" is determined based on value of "q" and range represented by node 304. In this illustrative example, the value of "3" for parameter "a" can be used in combination with value of "q" to generate a range such that the range contains all values represented by node 304. For example, a range of [q−a, q+a] can be generated to obtain a range of [48−3, 48+3] to indicate that the range of [45, 51] contains all values represented by node 304. In other words, the range of [q−a, q+a] contains all values represented by the node 304 when a>3.

In a similar fashion, a value of "32" for parameter "a" is determined based on value of "q" and range represented by node 306. In this illustrative example, the value of "32" for parameter "a" can be used in combination with value of "q" to generate a range such that the range contains all values represented by node 306. For example, a range of [q−a, q+a] can be generated to obtain a range of [48−32, 48+32] to indicate that the range of [16, 80] contains all values represented by node 306. In other words, the range of [q−a, q+a] contains all values represented by node 306 when a>32.

In this illustrative example, the value of "3" and the value of "32" can be examples of second values 244 in FIG. 2. In addition, the range of [45, 51] and the range of [16, 80] can be examples of second ranges 218 in FIG. 2.

In addition, a value of "2" for parameter "a" is determined based on value "0", value of "q" and range represented by node 304. In this illustrative example, value "0" is used to make sure the value determined for "a" is a positive number. In this illustrative example, the value of "2" for parameter "a" can be used in combination with value of "q" to generate a range such that the range intersects with the range represented by node 304. For example, a range of [q−a, q+a] can be generated to obtain a range of [48−2, 48+2] to indicate that the range of [46, 50] intersects with the range represented by node 304. In other words, the range of [q−a, q+a] contains a range of values that overlaps with the range represented by node 304 when a>2.

In a similar fashion, a value of "22" for parameter "a" is determined based on value "0", value of "q" and range represented by node 306. In this illustrative example, value "0" is used to make sure the value determined for "a" is a positive number. In this illustrative example, the value of "22" for parameter "a" can be used in combination with value of "q" to generate a range such that the range intersects with the range represented by node 306. For example, a range of [q−a, q+a] can be generated to obtain a range of [48−22, 48+22] to indicate that the range of [26, 70] intersects with the range represented by node 306. In other words, the range of [q−a, q+a] contains a range of values that overlaps with the range represented by node 306 when a>22.

In this illustrative example, the value of "2" and the value of "22" can be examples of third values 248 in FIG. 2. In addition, the range of [46, 50] and the range of [26, 70] can be examples of third ranges 220 in FIG. 2.

Further, a value of "22" for parameter "a" is determined by identifying the maximum from the value of "2" and the value "22". In this illustrative example, the value of "22" for parameter "a" can be used in combination with value of "q" to generate a range such that the range intersects with both ranges represented by node 304 and node 306. For example, a range of [q−a, q+a] can be generated to obtain a range of [48−22, 48+22] to indicate that the range of [26, 70] intersects with both ranges represented by node 304 and node 306. In other words, the range of [q−a, q+a] contains a range of values that overlaps with both ranges represented by node 304 and node 306 when a>22. In this illustrative example, the value of "22" can be examples of fourth value 252 in FIG. 2.

In this illustrative example, a final value for parameter "a" for the second round of traversal is determined by identifying the minimum from the value of "3", the value of "32", the value of "22", and the value of "8". In this illustrative example, the existing value for parameter "a" is also included when determining the final value for parameter "a" for the second round of traversal. As a result, the value of "3" is identified as the final value for parameters "a". In other words, the second round of traversal narrows down the range for identifying the leaf from range of [q−a, q+a] m where a<8 to a range of [q−a, q+a] m where a<3. In this illustrative example, the value of "3" can be examples of first value 250 in FIG. 2.

In this illustrative example, node 304 is selected for further processing since range of [q−a, q+a] m where a<3 does not include values contained in range of [70,80], which is represented by node 306. In this illustrative example, node 304 is set as the node at the highest depth of tree 300 and the rest of tree 300 is disregarded in the third round of traversal for tree 300.

The value of "3" is set as the existing value for parameter "a" in the third round of traversal for tree 300. In this illustrative example, the third round of traversal for tree 300 repeats the above mentioned steps for the node at the highest depth in portion 308 to determine new values for parameter "a" such that the range generated based on parameter "a" can be used to further narrow down the range for identifying the leaf. As shown in portion 308, node 304 is set as the node at the highest depth and node 304 is associated with leaf 310 and leaf 312. In this illustrative example, leaf 310 and leaf 312 are at the lowest depth of tree 300. In other words, leaf 310 and leaf 312 represent a single point that includes a range of values that contain 1 value in 1-dimensional space.

In the third round of traversal for tree 300, a value of "2" for parameter "a" is determined based on value of "q" and range represented by leaf 310. In this illustrative example, the value of "2" for parameter "a" can be used in combination with value of "q" to generate a range such that the range contains all values represented by leaf 310. For example, a range of [q−a, q+a] can be generated to obtain a range of [48−2, 48+2] to indicate that the range of [46, 50] contains all values represented by leaf 310. In other words, the range of [q−a, q+a] contains all values represented by the leaf 310 when a>2.

In a similar fashion, a value of "3" for parameter "a" is determined based on value of "q" and range represented by leaf 312. In this illustrative example, the value of "3" for parameter "a" can be used in combination with value of "q" to generate a range such that the range contains all values represented by leaf 312. For example, a range of [q−a, q+a] can be generated to obtain a range of [48−3, 48+3] to indicate that the range of [45, 51] contains all values represented by leaf 312. In other words, the range of [q−a, q+a] contains all values represented by leaf 312 when a>3.

In this illustrative example, the value of "2" and the value of "3" can be examples of second values 244 in FIG. 2. In addition, the range of [46, 50] and the range of [46, 50] can be examples of second ranges 218 in FIG. 2.

As depicted, leaf 310 and leaf 312 represent a single point that includes a range of values that only contain 1 value in 1-dimensional space. Therefore, it is unnecessary to determine values for parameter "a" such that ranges generated based on values for parameter "a" and value of "q" intersect with leaf 310 or leaf 312.

In this illustrative example, a final value for parameter "a" for the third round of traversal is determined by identifying the minimum from the value of "3" and the value of "2". In this illustrative example, the existing value for parameter "a" is also included when determining the final value for parameter "a" for the third round of traversal. As a result, the value of "3" is identified as the final value for parameter "a". In other words, the third round of traversal narrows down the range for identifying the leaf from range of [q−a, q+a] m where a<3 to a range of [q−a, q+a] m where a<2. In this illustrative example, the value of "2" can be examples of first value 250 in FIG. 2.

In this illustrative example, leaf 310 is selected as the leaf that represents the point with the value that is closest to the value of "q" since range of [q−a, q+a] m where a<2 does not include values contained in range of [51,51], which is represented by leaf 312.

The illustration of the process flow for identifying the leaf in a tree in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, the above mentioned method can also be applied to tree 300 where nodes in tree 300 represent points that include values in a 2-dimensional space, 3-dimensional space, or a dimensional space with any number of dimensions.

Figure 4:
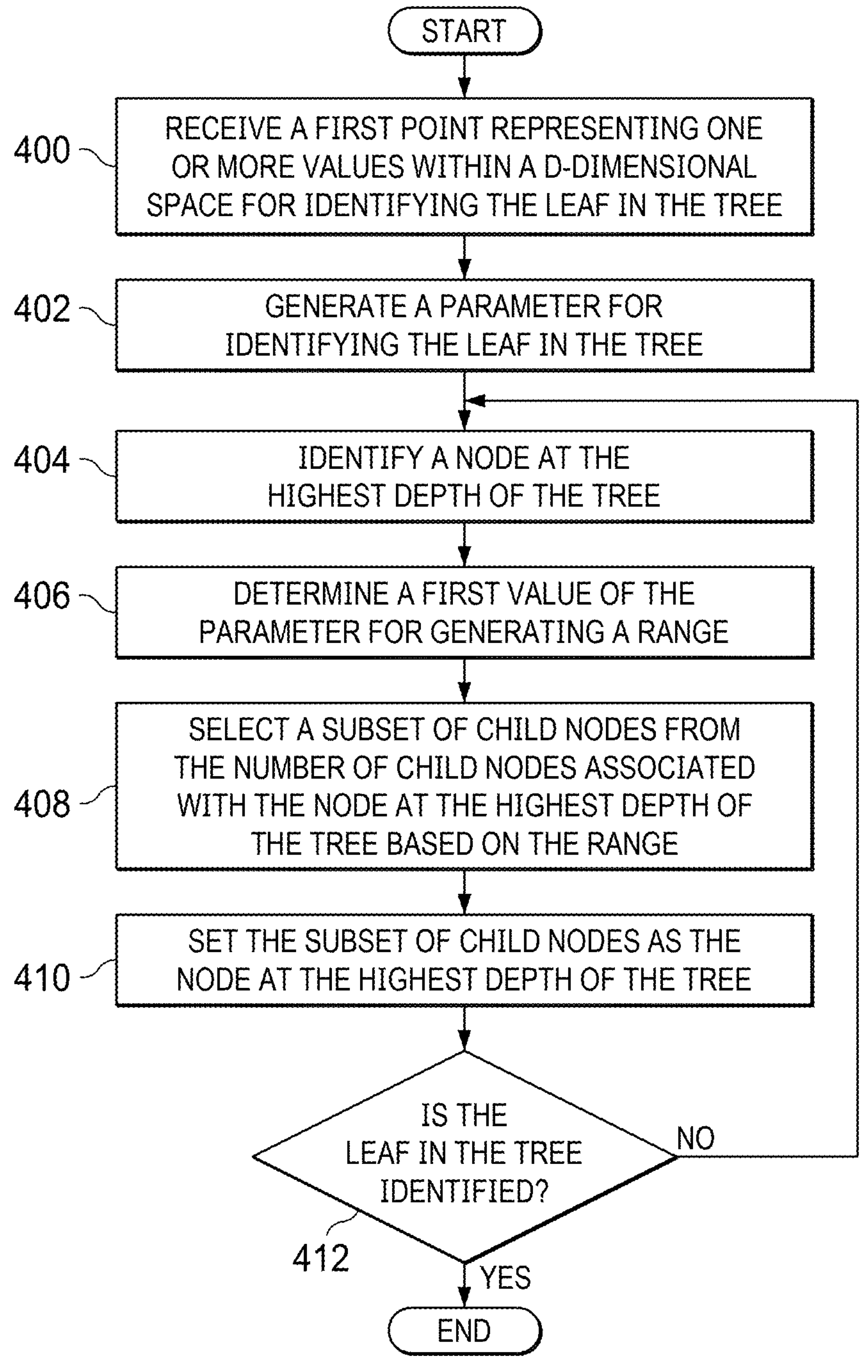
FIG. 4 is a flowchart of a process for identifying a leaf in a tree in accordance with an illustrative embodiment.

With reference now to FIG. 4, a flowchart illustrating a process for identifying a leaf in a tree is shown in accordance with an illustrative embodiment. The process in FIG. 4 can be implemented in hardware, software, or both. When implemented in software, the process can take the form of program instructions that are run by one of more processor units located in one or more hardware devices in one or more computer systems. For example, the process can be implemented in search manager 212 in computer system 204 in FIG. 2.

The process begins by receiving a first point representing one or more values within a d-dimensional space for identifying the leaf in the tree (step 400). In step 400, the tree is generated based on a set of values within the d-dimensional space. In addition, each node in the tree represents a subset of points with a bounding simplex within the d-dimensional space. The process generates a parameter for identifying the leaf in the tree (step 402). In step 402, the leaf in the tree represents a second point representing one or more values that is nearest to the first point.

The process identifies a node at the highest depth of the tree (step 404). In step 404, the node at the highest depth of the tree is associated with a number of child nodes. The process determines a first value of the parameter for generating a range (step 406). In step 406, the first value is determined based on the existing value for the parameter and bounding simplexes for all child nodes associated with the node at the highest depth of the tree.

The process selects a subset of child nodes from the number of child nodes associated with the node at the highest depth of the tree based on the range (step 408). In step 408, the subset of child nodes represents points for values within a subrange that overlaps with the range. The process sets the subset of child nodes as the node at the highest depth of the tree (step 410).

The process determines whether the leaf in the tree is identified (step 412). In this step, the leaf in the tree is identified if the subset of child nodes includes a leaf at the lowest depth of the tree. If the leaf in the tree is identified, the process terminates thereafter. With reference again to step 412, if the leaf in the tree is not identified, the process returns to step 404 and repeats step 404 to step 412 until the leaf in the tree is identified. In other words, the process traverses the tree by repeating the identifying step, the determining step, the selecting step, and setting steps until the leaf in the tree is identified. The process terminates thereafter.

Figure 5:
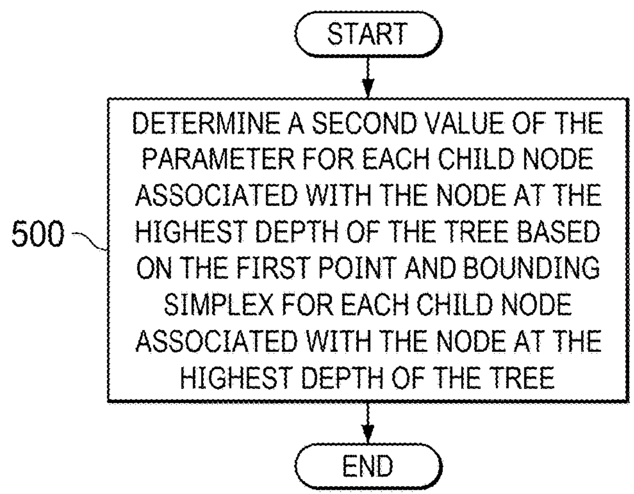
FIG. 5 is a flowchart of a process for generating a first value for a parameter in accordance with an illustrative embodiment.

Turning next to FIG. 5, a flowchart of a process for generating a first value for a parameter is depicted in accordance with an illustrative embodiment. The process in this flowchart is an example of an implementation for step 406 in FIG. 4.

The process begins by determining a second value of the parameter for each child node associated with the node at the highest depth of the tree based on the first point and bounding simplex for each child node associated with the node at the highest depth of the tree (step 500). In this step, the bounding simplex for each child node associated with the node at the highest depth of the tree is contained within a second range determined for each child node associated with the node at the highest depth of the tree. In addition, the second ranges are determined based on the second value of the parameter for each child node associated with the node at the highest depth of the tree and the first point. The process terminates thereafter.

Figure 6:
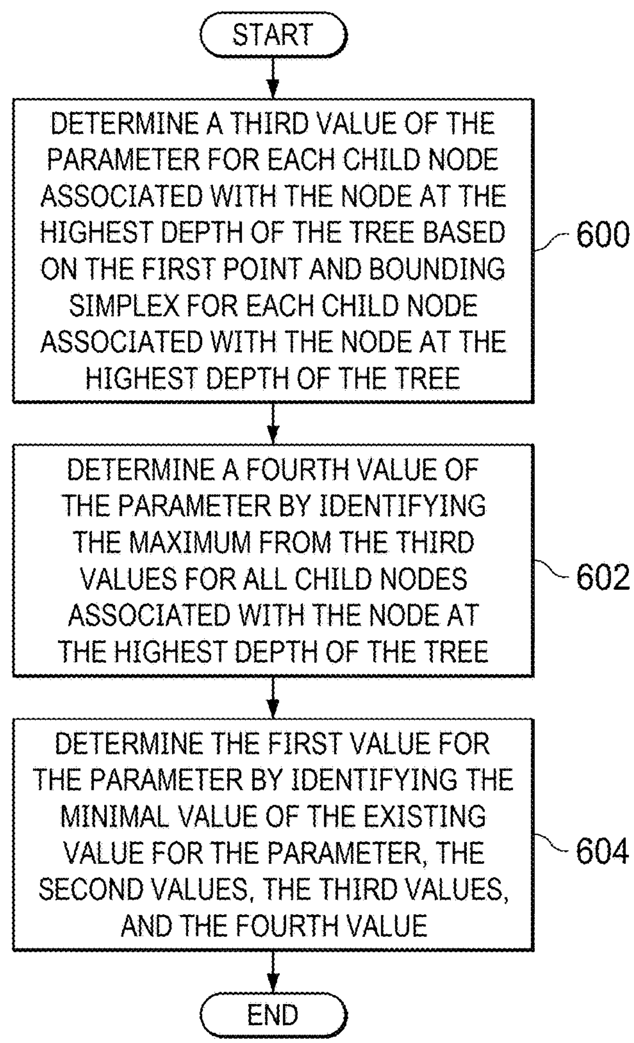
FIG. 6 is a flowchart of a process for generating a first value for a parameter in accordance with an illustrative embodiment.

Turning next to FIG. 6, a flowchart of a process for generating a first value for a parameter is depicted in accordance with an illustrative embodiment. The process in this figure is an example of an additional step that can be performed with the steps in FIG. 5.

The process begins by determining a third value of the parameter for each child node associated with the node at the highest depth of the tree based on the first point and bounding simplex for each child node associated with the node at the highest depth of the tree (step 600). In this step, the bounding simplex for each child node associated with the node at the highest depth of the tree is intersected with a third range determined for each child node associated with the node at the highest depth of the tree. In addition, the third ranges are determined based on the third value of parameter for each child node associated with the node at the highest depth of the tree and the first point.

The process determines a fourth value of the parameter by identifying the maximum from the third values for all child nodes associated with the node at the highest depth of the tree (step 602). The process determines the first value for the parameter by identifying the minimal value of the existing value for the parameter, the second values, the third values, and the fourth value (step 604). The process terminates thereafter.

Figure 7:
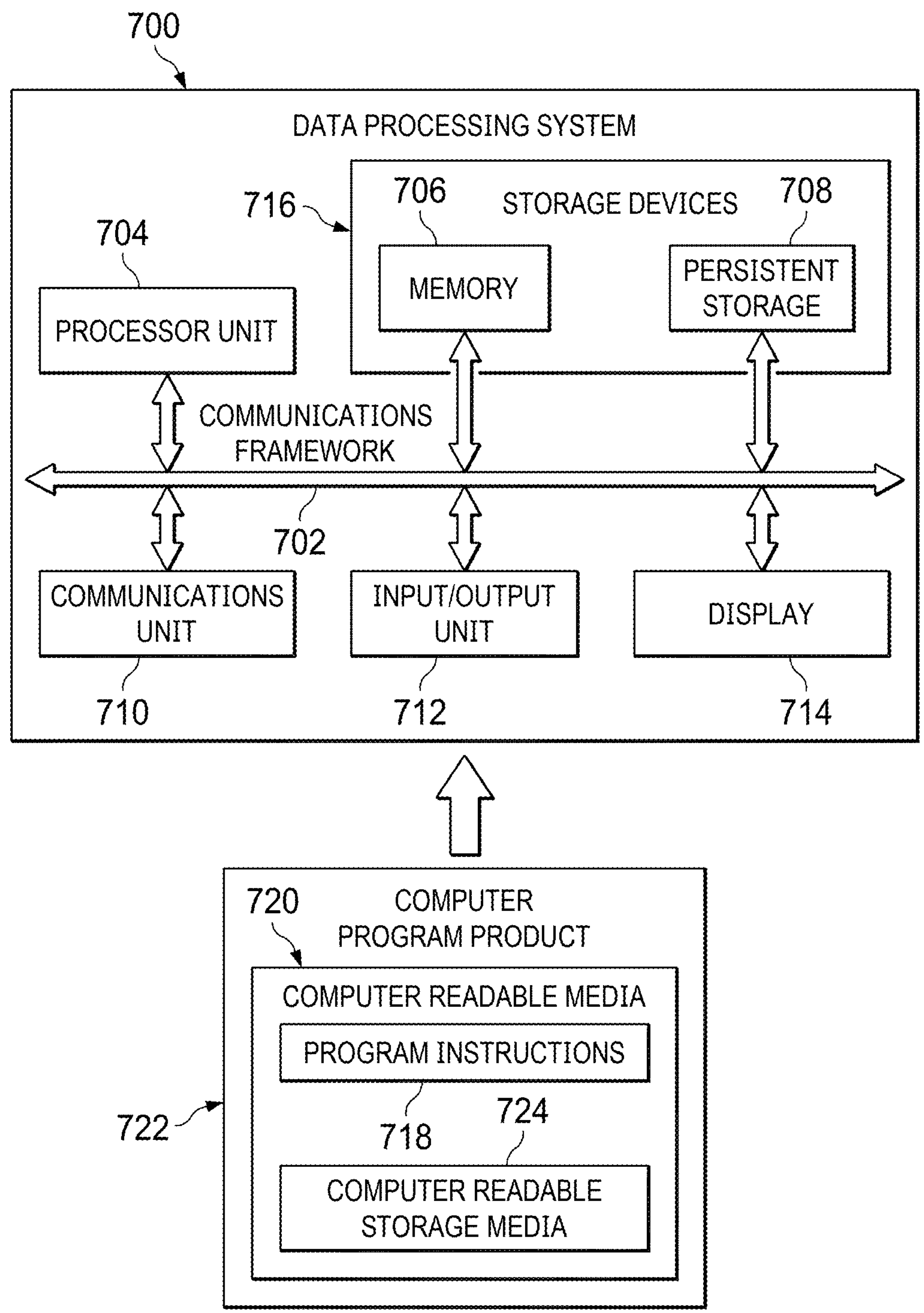
FIG. 7 is a block diagram of a data processing system in accordance with an illustrative embodiment.

Turning now to FIG. 7, a block diagram of a data processing system is depicted in accordance with an illustrative embodiment. Data processing system 700 can be used to implement computers and computing devices in computing environment 100 in FIG. 1. Data processing system 700 can also be used to implement computer system 204 in FIG. 2. In this illustrative example, data processing system 700 includes communications framework 702, which provides communications between processor unit 704, memory 706, persistent storage 708, communications unit 710, input/output (I/O) unit 712, and display 714. In this example, communications framework 702 takes the form of a bus system.

Processor unit 704 serves to execute instructions for software that can be loaded into memory 706. Processor unit 704 includes one or more processors. For example, processor unit 704 can be selected from at least one of a multicore processor, a central processing unit (CPU), a graphics processing unit (GPU), a physics processing unit (PPU), a digital signal processor (DSP), a network processor, or some other suitable type of processor. Further, processor unit 704 can be implemented using one or more heterogeneous processor systems in which a main processor is present with secondary processors on a single chip. As another illustrative example, processor unit 704 can be a symmetric multi-processor system containing multiple processors of the same type on a single chip.

Memory 706 and persistent storage 708 are examples of storage devices 716. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 716 may also be referred to as computer-readable storage devices in these illustrative examples. Memory 706, in these examples, can be, for example, a random-access memory or any other suitable volatile or non-volatile storage device. Persistent storage 708 may take various forms, depending on the particular implementation.

For example, persistent storage 708 may contain one or more components or devices. For example, persistent storage 708 can be a hard drive, a solid-state drive (SSD), a flash memory, a rewritable optical disk, a rewritable magnetic tape, or some combination of the above. The media used by persistent storage 708 also can be removable. For example, a removable hard drive can be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that can be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs can be located in storage devices 716, which are in communication with processor unit 704 through communications framework 702. The processes of the different embodiments can be performed by processor unit 704 using computer-implemented instructions, which may be located in a memory, such as memory 706.

These instructions are referred to as program instructions, computer usable program instructions, or computer-readable program instructions that can be read and executed by a processor in processor unit 704. The program instructions in the different embodiments can be embodied on different physical or computer-readable storage media, such as memory 706 or persistent storage 708.

Program instructions 718 are located in a functional form on computer-readable media 720 that is selectively removable and can be loaded onto or transferred to data processing system 700 for execution by processor unit 704. Program instructions 718 and computer-readable media 720 form computer program product 722 in these illustrative examples. In the illustrative example, computer-readable media 720 is computer-readable storage media 724.

Computer-readable storage media 724 is a physical or tangible storage device used to store program instructions 718 rather than a medium that propagates or transmits program instructions 718. Computer-readable storage media 724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 718 can be transferred to data processing system 700 using a computer-readable signal media. The computer-readable signal media are signals and can be, for example, a propagated data signal containing program instructions 718. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 720" can be singular or plural. For example, program instructions 718 can be located in computer-readable media 720 in the form of a single storage device or system. In another example, program instructions 718 can be located in computer-readable media 720 that is distributed in multiple data processing systems. In other words, some instructions in program instructions 718 can be located in one data processing system while other instructions in program instructions 718 can be located in one data processing system. For example, a portion of program instructions 718 can be located in computer-readable media 720 in a server computer while another portion of program instructions 718 can be located in computer-readable media 720 located in a set of client computers.

The different components illustrated for data processing system 700 are not meant to provide architectural limitations to the manner in which different embodiments can be implemented. In some illustrative examples, one or more of the components may be incorporated in or otherwise form a portion of another component. For example, memory 706, or portions thereof, may be incorporated in processor unit 704 in some illustrative examples. The different illustrative embodiments can be implemented in a data processing system including components in addition to or in place of those illustrated for data processing system 700. Other components shown in FIG. 7 can be varied from the illustrative examples shown. The different embodiments can be implemented using any hardware device or system capable of running program instructions 718.

Thus, illustrative embodiments of the present disclosure provide a computer-implemented method, computer system, and computer program product for managing containers. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for identifying a leaf in a tree, the computer implemented method comprising:

receiving, by a processor set, a first point representing one or more values within a d-dimensional space for identifying the leaf in the tree, wherein the tree is generated based on a set of values within the d-dimensional space, and wherein each node in the tree represents a subset of points with a bounding simplex within the d-dimensional space;

generating, by the processor set, a parameter for identifying the leaf in the tree, wherein the leaf in the tree represents a second point representing one or more values that is nearest to the first point;

identifying, by the processor set, a node at highest depth of the tree, wherein the node at the highest depth of the tree is associated with a number of child nodes;

determining, by the processor set, a first value of the parameter for generating a range, wherein the first value is determined based on existing value for the parameter and bounding simplexes for all child nodes associated with the node at the highest depth of the tree;

selecting, by the processor set, a subset of child nodes from the number of child nodes associated with the node at the highest depth of the tree based on the range, wherein the subset of child nodes represent points for values within a subrange that overlaps with the range;

setting, by the processor set, the subset of child nodes as the node at the highest depth of the tree; and traversing, by the processor set, the tree by repeating the identifying step, the determining step, the selecting step, and setting steps until the leaf in the tree is identified.

2. The computer implemented method of claim 1, wherein the determining, by the processor set, a first value of the parameter for generating a range comprises:

determining, by the processor set, a second value of the parameter for each child node associated with the node at the highest depth of the tree based on the first point and bounding simplex for each child node associated with the node at the highest depth of the tree, wherein the bounding simplex for each child node associated with the node at the highest depth of the tree is contained within a second range determined for each child node associated with the node at the highest depth of the tree, and wherein the second ranges are determined based on the second value of the parameter for each child node associated with the node at the highest depth of the tree and the first point.

3. The computer implemented method of claim 2, further comprising:

determining, by the processor set, a third value of the parameter for each child node associated with the node at the highest depth of the tree based on the first point and bounding simplex for each child node associated with the node at the highest depth of the tree, wherein the bounding simplex for each child node associated with the node at the highest depth of the tree is intersected with a third range determined for each child node associated with the node at the highest depth of the tree, and wherein the third ranges are determined based on the third value of parameters for each child node associated with the node at the highest depth of the tree and the first point;

determining, by the processor set, a fourth value of the parameter by identifying a maximum from the third values for all child nodes associated with the node at the highest depth of the tree; and determining, by the processor set, the first value for the parameter by identifying a minimal value of the existing value for the parameter, the second values, the third values, and the fourth value.

4. The computer implemented method of claim 1, wherein the tree is a partition tree.

5. The computer implemented method of claim 1, wherein the d-dimensional space comprises a two dimension space or a three dimension space.

6. The computer implemented method of claim 1, wherein each node in the tree represents a geographical location.

7. The computer implemented method of claim 1, wherein the identification of the leaf in the tree is used in combination with homomorphic encryption.

8. A computer system for identifying a leaf in a tree, comprising:

a processor set;

a set of one or more computer-readable storage media; and program instructions stored on the set of one or more storage media to cause the processor set to perform operations comprising:

receiving a first point representing one or more values within a d-dimensional space for identifying the leaf in the tree, wherein the tree is generated based on a set of values within the d-dimensional space, and wherein each node in the tree represents a subset of points with a bounding simplex within the d-dimensional space;

generating a parameter for identifying leaf in the tree, wherein the leaf in the tree represents a second point representing one or more values that is nearest to the first point;

identifying a node at highest depth of the tree, wherein the node at the highest depth of the tree is associated with a number of child nodes;

determining a first value of the parameter for generating a range, wherein the first value is determined based on an existing value for the parameter and bounding simplexes for all child nodes associated with the node at the highest depth of the tree;

selecting a subset of child nodes from the number of child nodes associated with the node at the highest depth of the tree based on the range, wherein the subset of child nodes represents points for values within a subrange that overlaps with the range;

setting the subset of child nodes as the node at the highest depth of the tree; and traversing, by the processor set, the tree by repeating the identifying step, the determining step, the selecting step, and setting steps until the leaf in the tree is identified.

9. The computer system of claim 8, wherein the determining a first value of the parameter for generating a range comprises:

determining a second value of the parameter for each child node associated with the node at the highest depth of the tree based on the first point and bounding simplex for each child node associated with the node at the highest depth of the tree, wherein the bounding simplex for each child node associated with the node at the highest depth of the tree is contained within a second range determined for each child node associated with the node at the highest depth of the tree, and wherein the second ranges are determined based on the second value of the parameter for each child node associated with the node at the highest depth of the tree and the first point.

10. The computer system of claim 9, wherein the operations further comprise:

determining a third value of the parameter for each child node associated with the node at the highest depth of the tree based on the first point and bounding simplex for each child node associated with the node at the highest depth of the tree, wherein the bounding simplex for each child node associated with the node at the highest depth of the tree is intersected with a third range determined for each child node associated with the node at the node at the highest depth of the tree, and wherein the third ranges are determined based on the third value of parameter for each child node associated with the node at the highest depth of the tree and the first point;

determining a fourth value of the parameter by identifying a maximum from the third values for all child nodes associated with the node at the highest depth of the tree; and determining the first value for the parameter by identifying a minimal value of the existing value for the parameter, the second values, the third values, and the fourth value.

11. The computer system of claim 10, wherein the tree is a partition tree.

12. The computer system of claim 10, wherein the d-dimensional space comprises a two dimension space or a three dimension space.

13. The computer system of claim 8, wherein each node in the tree represents a geographical location.

14. The computer system of claim 8, wherein the identification of the leaf in the tree is used in combination with homomorphic encryption.

15. A computer program product for identifying a leaf in a tree, comprising:

a set of one or more computer-readable storage media;

program instructions stored in the set of one or more storage media to perform operations comprising:

receiving, by a processor set, a first point representing one or more values within a d-dimensional space for identifying the leaf in the tree, wherein the tree is generated based on a set of values within the d-dimensional space, and wherein each node in the tree represents a subset of points with a bounding simplex within the d-dimensional space;

generating, by the processor set, a parameter for identifying the leaf in the tree, wherein the leaf in the tree represents a second point representing one or more values that is nearest to the first point;

identifying, by the processor set, a node at highest depth of the tree, wherein the node at the highest depth of the tree is associated with a number of child nodes;

determining, by the processor set, a first value of the parameter for generating a range, wherein the first value is determined based on existing value for the parameter and bounding simplexes for all child nodes associated with the node at the highest depth of the tree;

selecting, by the processor set, a subset of child nodes from the number of child nodes associated with the node at the highest depth of the tree based on the range, wherein the subset of child nodes represents points for values within a subrange that overlaps with the range;

setting, by the processor set, the subset of child nodes as the node at the highest depth of the tree; and traversing, by the processor set, the tree by repeating the identifying step, the determining step, the selecting step, and setting steps until the leaf in the tree is identified.

16. The computer program product of claim 15, wherein the determining, by the processor set, a first value of the parameter for generating a range comprises:

determining, by the processor set, a second value of the parameter for each child node associated with the node at the highest depth of the tree based on the first point and bounding simplex for each child node associated with the node at the highest depth of the tree, wherein the bounding simplex for each child node associated with the node at the highest depth of the tree is contained within a second range determined for each child node associated with the node at the highest depth of the tree, and wherein the second ranges are determined based on the second value of the parameter for each child node associated with the node at the highest depth of the tree and the first point.

17. The computer program product of claim 16, wherein the operations further comprise:

determining, by the processor set, a third value of the parameter for each child node associated with the node at the highest depth of the tree based on the first point and bounding simplex for each child node associated with the node at the highest depth of the tree, wherein the bounding simplex for each child node associated with the node at the highest depth of the tree is intersected with a third range determined for each child node associated with the node at the highest depth of the tree, and wherein the third ranges are determined based on the third value of the parameter for each child node associated with the node at the highest depth of the tree and the first point;

determining, by the processor set, a fourth value of the parameter by identifying a maximum from the third values for all child nodes associated with the node at the highest depth of the tree; and determining, by the processor set, the first value for the parameter by identifying a minimal value of the existing value for the parameter, the second values, the third values, and the fourth value.

18. The computer program product of claim 15, wherein the tree is a partition tree.

19. The computer program product of claim 15, wherein the d-dimensional space comprises a two dimension space or a three dimension space.

20. The computer program product of claim 15, wherein the identification of the leaf in the tree is used in combination with homomorphic encryption.

* * * * *